United States Patent
Hady

(10) Patent No.: US 7,451,182 B2
(45) Date of Patent: Nov. 11, 2008

(54) COORDINATING OPERATIONS OF NETWORK AND HOST PROCESSORS

(75) Inventor: Frank T. Hady, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1263 days.

(21) Appl. No.: 10/185,476

(22) Filed: Jun. 28, 2002

(65) Prior Publication Data

US 2004/0024821 A1     Feb. 5, 2004

(51) Int. Cl.
*G06F 15/16* (2006.01)
(52) U.S. Cl. .................. 709/206; 709/205; 709/207
(58) Field of Classification Search .................. 709/206
See application file for complete search history.

(56) References Cited

U.S. PATENT DOCUMENTS

| 6,185,607 | B1* | 2/2001 | Lo et al. | 709/213 |
| 6,473,434 | B1* | 10/2002 | Araya et al. | 370/412 |
| 6,675,163 | B1* | 1/2004 | Bass et al. | 707/6 |
| 6,754,735 | B2* | 6/2004 | Kale et al. | 710/33 |

* cited by examiner

*Primary Examiner*—John Follansbee
*Assistant Examiner*—Glenford Madamba
(74) *Attorney, Agent, or Firm*—Trop, Pruner & Hu, P.C.

(57) ABSTRACT

A host processor and a network processor may interact effectively, particularly with edge applications that involve tasks that are best handled independently by both the host and network processors. Data may be exchanged between the processors, for example, by simply passing pointers, avoiding the need for excessive data coping.

22 Claims, 6 Drawing Sheets

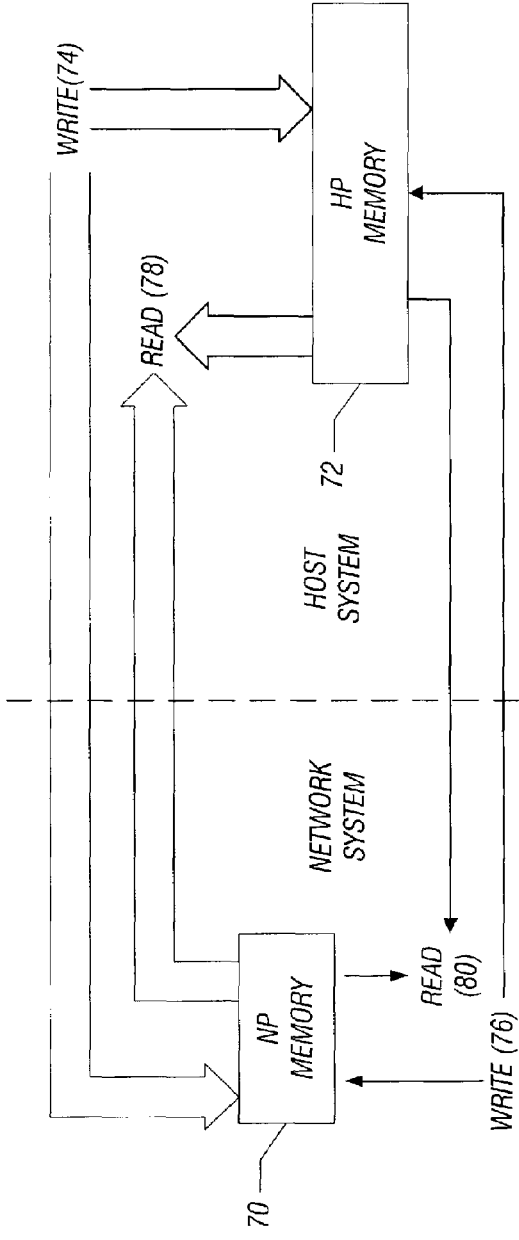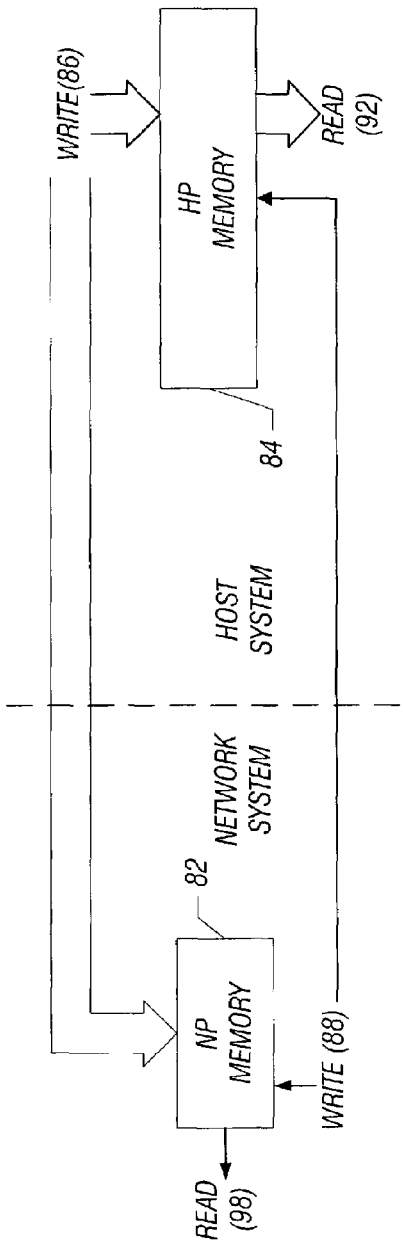
FIG. 4
FIG. 5

COORDINATING OPERATIONS OF NETWORK AND HOST PROCESSORS

BACKGROUND

This invention relates generally to processor-based systems and, particularly, to network processors utilized in connection with those systems.

Network processor-based systems accept network packets, explore the packet contents, modify the packets based on their content and the state data held on a node, and then may send the modified packet back into the network. Network processors perform the bit level packet header operations required by the Network and Internet Protocol (IP) specifications (layers 2 and 3 of the OSI network stack) at relatively rapid rates.

However, other applications may require not only this layer 2, 3 processing, but also higher level protocol processing and maybe even inspection of data held in the packet (layer 4 to layer 7 processing). Layers 4 through 7 require more processing per packet and often require different types of algorithms. Network processors may have difficulty handling these types of applications. These applications may be called edge applications, because they often occur on the edge of networks, rather than in the network's core where most of the work involves forwarding Internet Protocol packets.

Thus, there is a need for better ways for handling edge applications.

BRIEF DESCRIPTION OF THE DRAWINGS

FIG. 4 is a schematic depiction of a cache model in accordance with one embodiment of the present invention;

FIG. 5 is a schematic depiction of a copy model in accordance with one embodiment of the present invention;

DETAILED DESCRIPTION

Figure 1:
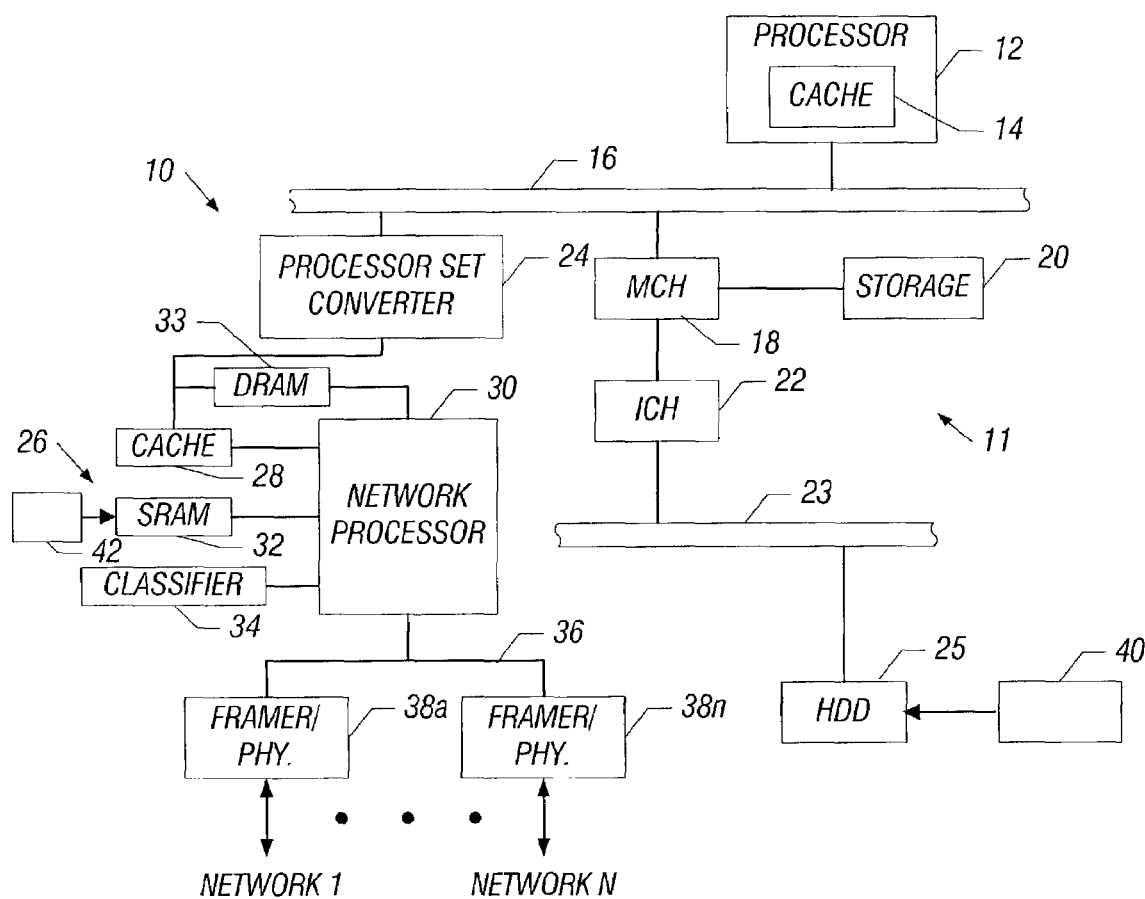
FIG. 1 is a schematic depiction of one embodiment of the present invention.

Referring to FIG. 1, system 10 may include a host processor-based system 11 coupled through a processor set converter 24 and a host bus 16 to a network processor-based system 26. The bus 16 may be cache coherent. The host processor-based system 11 includes a host processor 12 having a cache 14. The host processor 12 may be known as the general purpose processor. The host processor 12 is coupled to a host bus 16 that, in turn, is coupled to the remainder of the processor-based system 11.

In one embodiment of the present invention, the processor-based system 11 may use a memory controller hub (MCH) 18 coupled to a system memory 20 which may be dynamic random access memory (DRAM) in one embodiment. The memory controller hub 18 may in turn be coupled to an input/output controller hub (ICH) 22. However, in other embodiments, other architectures may be used including those that use conventional bridges instead of the hub system illustrated.

The input/output controller hub 22 may be coupled to a bus 23. The bus 23 may be in turn coupled to a storage device 25 such as a hard disk drive (HDD). Software or an application 42 may be stored on the storage 25 in one embodiment of the present invention.

The network processor-based system 26 may include a network processor 30 coupled to the host processor-based system 11 through a cache 28. A dynamic random access memory 33 may also be coupled to the processor 30. Also coupled to the network processor 30 may be a static random access memory (SRAM) 32. The SRAM 32 may store a software program 40 in accordance with one embodiment of the present invention. Also coupled to the network processor 30 is a classifier 34.

The network processor 30 may be coupled to a network processing bus 36. The bus 36 may be coupled to a plurality of framers or physical layer chips 38a through 38n. Each framer or physical layer chip 38a through 38n may be coupled to a different network as indicated.

Packets may arrive from the indicated networks to the framer/physical layer chips 38a through 38n. The network processor system 26 performs processing for which it is best qualified and then provides the host processor 12 with a pointer to the processed data. The host processor 12 then works on the packet and, when finished, passes a pointer back to the network processor 30. The network processor 30 finishes the work on the packet and sends it out again to the network. The processor 30 may pass a pointer, as well as data, telling the host processor 12 what to do with the pointer.

Each processor 12 or 30 performs the tasks for which it is best qualified. Movement of data between the host processor 12 and the network processor 30 may be through the cache 28 of the network processor-based system 26 and the cache 14 of the host processor 12 in one embodiment of the present invention. In other embodiments, the data exchange may be handled through the main memory 20, especially when cache-to-cache communication is not available.

In some cases, the heterogeneous processor sets associated with the disparate processors 12 and 30 may require some conversion in the processor set converter 24. In some embodiments, the converter 24 may be implemented by the network processor 30. In other embodiments, the converter 24 may be part of a stand-alone device such as a Field Programmable Gate Array (FPGA) that snoops memory writes on the network processor-based system 26, reformats the data, transitions it to the host processor bus 16 domain, and masters the data on the host processor bus 16. It may also snarfs writes on the host processor bus 16, reforms them, and then writes them to a dual ported local memory on the network processor-based system 26.

Figure 2:
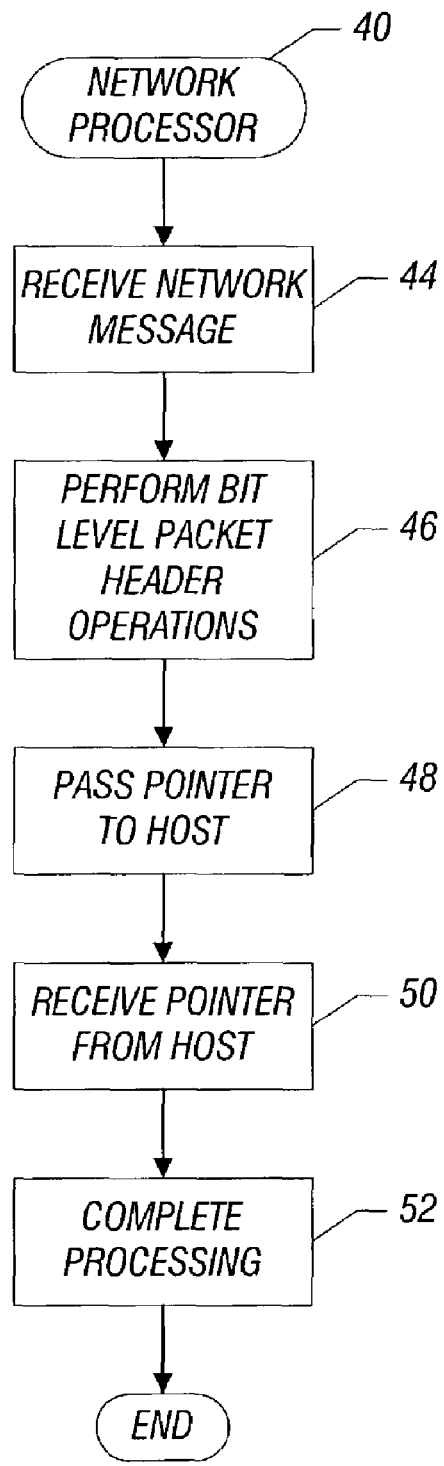
FIG. 2 is a flow chart for software utilized on the network processor shown in FIG. 1 in accordance with one embodiment of the present invention.

Referring to FIG. 2, the network processing application 40 may receive a message from one or more of the coupled networks as indicated in block 44. The network processor 30 may then perform those tasks which it is most suitably qualified for. For example, one network processor 30 may perform bit level packet header operations as indicated in block 46. When the processor 30 has completed its operations, it passes a pointer to the host processor 12. The host processor then may use the pointer to access the processed data in an appropriate storage device such as the cache 28, the cache 14, or the system memory 20.

The network processor 30 then awaits the data return from the host processor 12. When the network processor 30 receives a pointer from the host processor 12, as indicated in block 50, the network processor 30 then completes the processing as indicated in block 52. Again, the data handoff may be via a cache 28 or 14 or through system memory 20, as a few examples.

The network processor 30 may write to a host processor memory, such as its cache 14, directly through the host processor's bus 16. The network processor 30 may write to the cache 14, for example, without writing to its own memory 28, 32, or 33.

Figure 3:
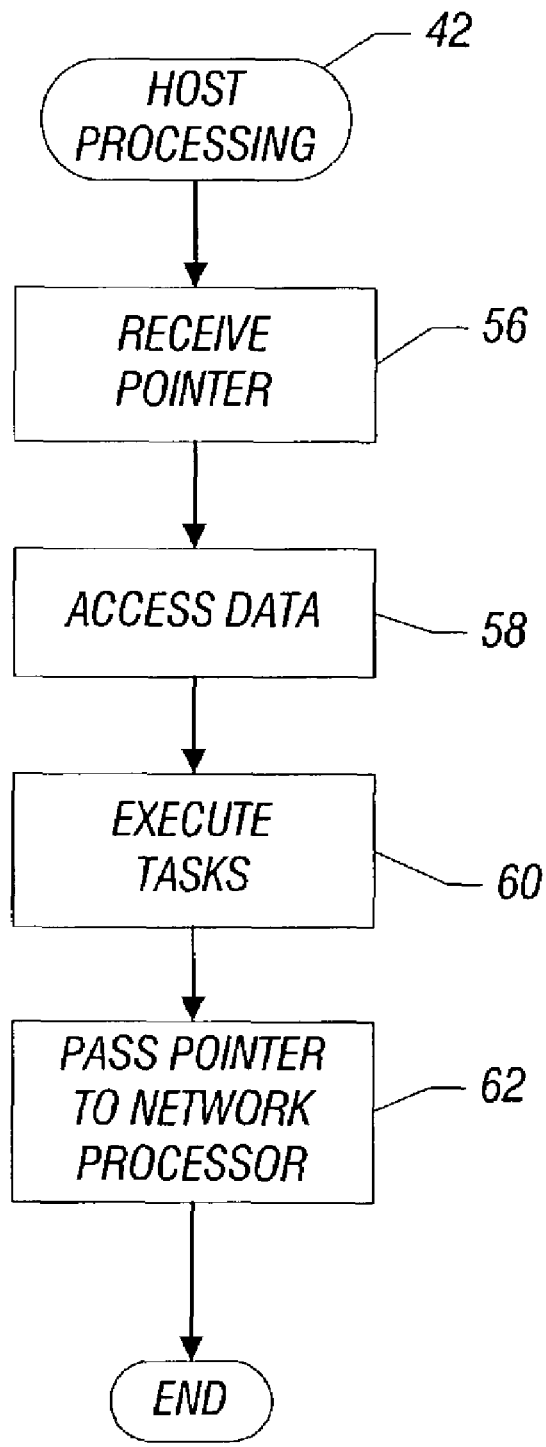
FIG. 3 is a flow chart for software utilized on the host processor in accordance with one embodiment of the present invention.

The host processing application 42, shown in FIG. 3, begins by receiving a pointer from the network processor 30 as indicated in block 56. The pointer enables the host processor 12 to access the data it needs to more efficiently execute edge application tasks not efficiently executed by the network processor 30. The host processor 12 accesses the data in the appropriate cache or storage as indicated in block 58. The host processor 12 then executes those tasks for which it is most suited as indicated in block 60. Thereafter, the host processor 12 passes the pointer to the network processor 30 as indicated in block 62. This pointer may point to data contained in any one of the caches 28 or 14 or the system memory 20, to mention a few examples.

In some embodiments of the present invention, efficient coordination may occur between network and host processors since no memory copies may be needed when moving data from one processor to the other through cache-to-cache communication. A relatively high speed connection may be made between the processors using front side bus (FSB) rates. In some embodiments, low latency, fine grain cache line communication between the processors may be possible. The end result may be faster execution for complex and more important edge applications.

The read protocol just described may be termed a cache-to-cache or "cache" model. As illustrated in FIG. 4, the host processor 12 may write, as indicated at 74, to both the host processor's memory 72 and the network processor's memory 70. The host processor 12 may read, as indicated at 78, from both its own local memory 72 and the memory 70 of the network processor 30. Similarly, as indicated at 76, a network processor 30 may write to its own memory 70 as well as the memory 72 of the host processor 12. A network processor 30 may read, as indicated at 80, from its own memory 70 and from the memory 72 associated with the host processor 12. Thus, a truly symmetrical system is possible.

An asymmetric cache is also possible. Here, for example, the network processor 30 can write to the host processor 12 memory 72, and read from the host processor 12 memory 72, but the host processor 12 cannot read/write the network processor 30 memory 70, in some embodiments.

With some host processors, it is not possible to read from a memory associated with another processor. Thus, a different protocol may be utilized which may be referred to as a "copy" architecture, shown in FIG. 5 in accordance with one embodiment of the present invention. In such case, the host processor 12 may write, as indicated at 86, as described previously. Similarly, the network processor 30 may write, as indicated at 88 and described previously.

The difference between the cache and the copy models arises in connection with the reads. In the host processor 12 only reads, as indicated at 92, from its own local memory 84. Likewise, the network processor 30 only reads, as indicated at 90, from its own memory 82 in one embodiment. The way the copy architecture may be implemented, in accordance with one embodiment of the present invention, is that writes by the network processor 30 to its local memory 70 also write to the memory 72 associated with the host processor 12.

In some cases, the network processor 30 may have two physical memories and in such case, writes to either or both of those memories, in particular regions, also write to the host processor's memory 72. These particular regions may be fixed, variable, or programmable. Host processor writes to its local memory may also go to a local memory 70 of the network processor. In one embodiment, the local memory 70 of the network processor may be a dual ported static random access memory (SRAM). Other dual ported memories that may be available may also be used.

Figure 6:
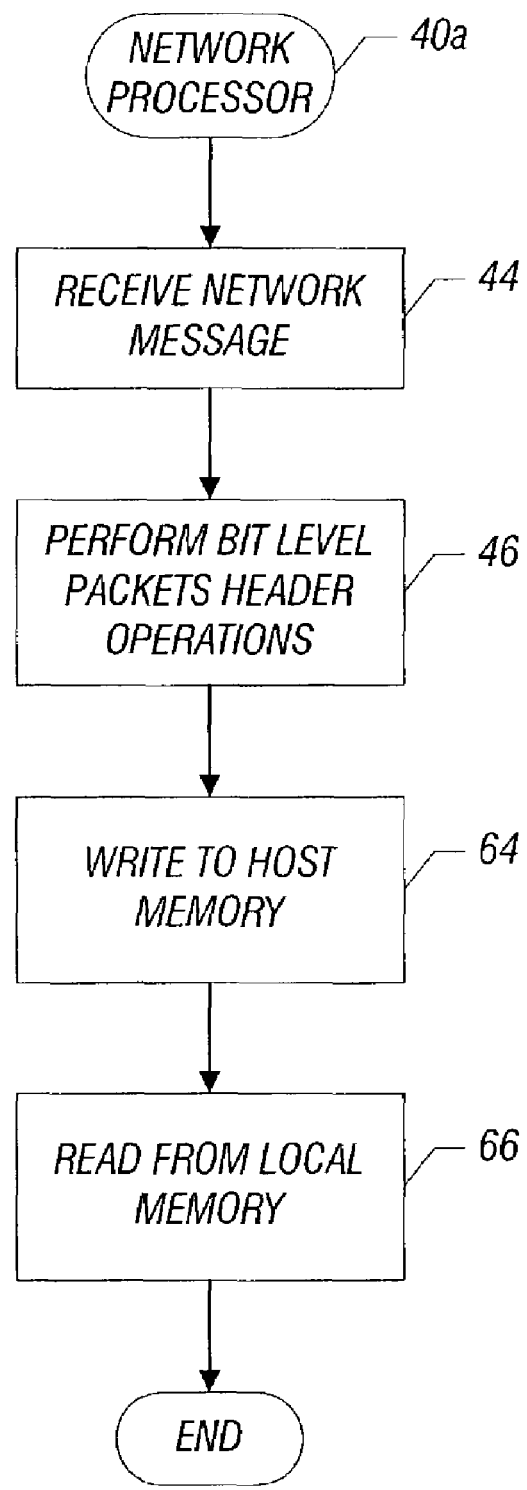
FIG. 6 is a flow chart for a network processing application in a copy model in accordance with one embodiment of the present invention.
Figure 7:
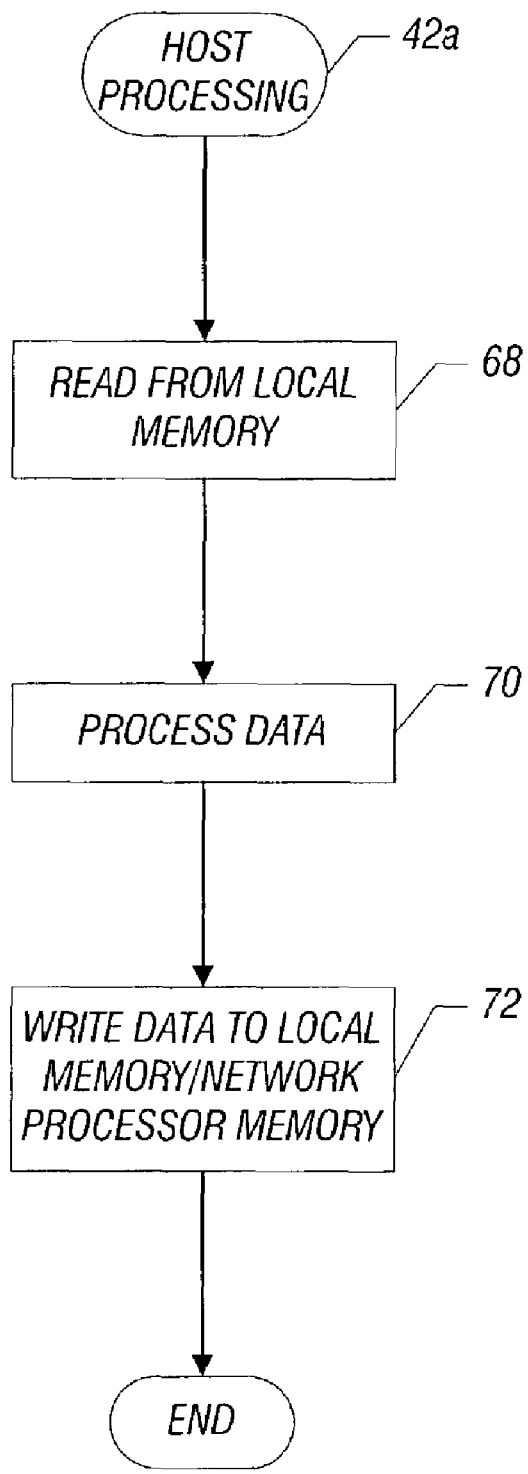
FIG. 7 is a flow chart for a host processor-based system in a copy model in accordance with one embodiment of the present invention.

Turning next to FIG. 6, the software 40a for implementing the network processor in a copy model begins, as before, by receiving a network message, as indicated in block 44, and performing bit level packets header operations, as indicated in block 46. As in the cache-to-cache model, the network processor may write to the host memory 64, providing information for host processing of the packet message. At the same time, the network processor may write to its own local memory. The network processor receives the results of the host processor's operation by reading the results in the network processor's own local memory, as indicated in block 66.

The host processing software 42a for a copy model begins by reading from the host processor's local memory, as indicated in block 68. This avoids the need for reads from memory not directly associated with the host processor. The host processor then processes the data as indicated in block 70. The results may then be written to the network processor's local memory, as indicated in block 72, and may also be written to a local memory associated with the host processor.

The copy architecture has an advantage, in some embodiments, that reads are as low latency as possible, since the data being read is guaranteed to reside in local memory. In some embodiments, only writes to particular address ranges associated with the copy architecture are written to both systems. In some embodiments, those address ranges may be fixed and in other embodiments, those address ranges may be programmable.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   processing a network message in a network processor; and
   writing data associated with said message to a memory associated with the network processor and to a memory associated with a host processor coupled to said network processor using a single network processor instruction to write to both memories.

2. The method of claim 1 including translating the network processor memory address to a host processor memory address.

3. The method of claim 1 including sending information about the write directly to a host processor bus.

4. The method of claim 1 including taking the write off a memory bus.

5. The method of claim 4 including taking the write off a memory bus coupled to a dynamic random access memory.

6. The method of claim 4 including taking the write off a static random access memory bus.

7. The method of claim 4 including taking the write off a dedicated memory bus.

8. The method of claim 1 wherein processing a network message in a network processor includes performing bit level packet header operations.

9. The method of claim 1 wherein writing data includes writing data to a memory associated with said network processor and a cache associated with said host processor.

10. The method of claim 1 where the host processor accesses the data written by the network processor through standard memory read operations.

11. An article comprising a medium storing instructions that, if executed, enable a processor-based system to perform the steps of:
processing a network message in a network processor; and
writing data associated with said message to a memory associated with the network processor and a memory associated with a host processor coupled to said network processor using a single network processor instruction.

12. The article of claim 11 further storing instructions that, if executed, enable the system to perform the step of performing bit level packet header operations.

13. The article of claim 11 further storing instructions that, if executed, enable the system to perform the step of writing data to a memory associated with said network processor and a cache on the host bus of the host processor.

14. The article of claim 11 further storing instructions that, if executed, enable the system to perform the step of reading data from a memory associated with said host processor.

15. The article of claim 11 further storing instructions that, if executed, enable the system to perform the step of reading data from a memory associated with said network processor.

16. A system comprising:
a network processor;
a host processor coupled to said network processor; and
said network processor to write data associated with a network message to a memory associated with the network processor and to a memory associated with the host processor using a single network processor instruction to write to both memories.

17. The system of claim 16 including a memory bus coupled to a dynamic random access memory.

18. The system of claim 16 including a static access random memory bus.

19. The system of claim 16 including a dedicated memory bus.

20. The system of claim 16 wherein said network processor is coupled to a host processor by a host bus.

21. The system of claim 20 wherein said host bus is cache coherent.

22. The system of claim 20 including storage coupled to the host processor to be written with data associated with the network message by the network processor and by the general purpose processor, said network processor coupled to said general purpose processor-based system by the host bus.

* * * * *